United States Patent
Leaney

(10) Patent No.: US 8,854,919 B2
(45) Date of Patent: Oct. 7, 2014

(54) GENERATING INVERSION READY SEISMIC DATA

(75) Inventor: Walter Scott Leaney, Katy, TX (US)

(73) Assignee: WesternGeco L.L.C., Houston, TX (US)

( * ) Notice: Subject to any disclaimer, the term of this patent is extended or adjusted under 35 U.S.C. 154(b) by 442 days.

(21) Appl. No.: 13/227,252

(22) Filed: Sep. 7, 2011

(65) Prior Publication Data

US 2012/0057431 A1  Mar. 8, 2012

Related U.S. Application Data

(60) Provisional application No. 61/380,775, filed on Sep. 8, 2010.

(51) Int. Cl.
  *G01V 1/42* (2006.01)
  *G01V 1/30* (2006.01)

(52) U.S. Cl.
  CPC ... *G01V 1/42* (2013.01); *G01V 1/30* (2013.01); *G01V 2210/161* (2013.01)
  USPC .............................................. 367/57; 367/38

(58) Field of Classification Search
  USPC ....................................................... 367/38, 57
  See application file for complete search history.

(56) References Cited

U.S. PATENT DOCUMENTS

| | | | |
|---|---|---|---|
| 4,207,619 A | 6/1980 | Klaveness | |
| 4,573,148 A * | 2/1986 | Herkenhoff et al. | 367/47 |
| 4,813,027 A | 3/1989 | Tieman | |
| 4,839,869 A * | 6/1989 | Corcoran | 367/73 |
| 4,922,362 A | 5/1990 | Miller et al. | |
| 5,253,219 A | 10/1993 | Houston et al. | |
| 6,058,073 A * | 5/2000 | VerWest | 367/38 |
| 2006/0133207 A1* | 6/2006 | Vossen et al. | 367/47 |
| 2009/0296522 A1* | 12/2009 | Tang et al. | 367/28 |

OTHER PUBLICATIONS

Ostrander, W. J., "Plane-wave reflection coefficients for gas sands at nonnormal angles of incidence", Geophysics, vol. 49, No. 10 (Oct. 1984) pp. 1637-1648.*

International Search Report and Written Opinion of PCT Application No. PCT/US2011/050837 dated Mar. 19, 2012.

* cited by examiner

*Primary Examiner* — Ian J Lobo

(57) ABSTRACT

A technique includes receiving first seismic data acquired by one or more receivers in response to energy produced by one or more seismic sources interacting with a subsurface feature. The first seismic data is indicative of measured reflection coefficients for image points for the subsurface feature, the measured reflection coefficients are associated with incidence angles, and a range of the incidence angles varies with respect to an image point position. The technique includes processing the first seismic data in a machine to generate second data indicative of a normal incidence reflection coefficient for at least one of the image points not associated with a normal angle of incidence.

19 Claims, 3 Drawing Sheets

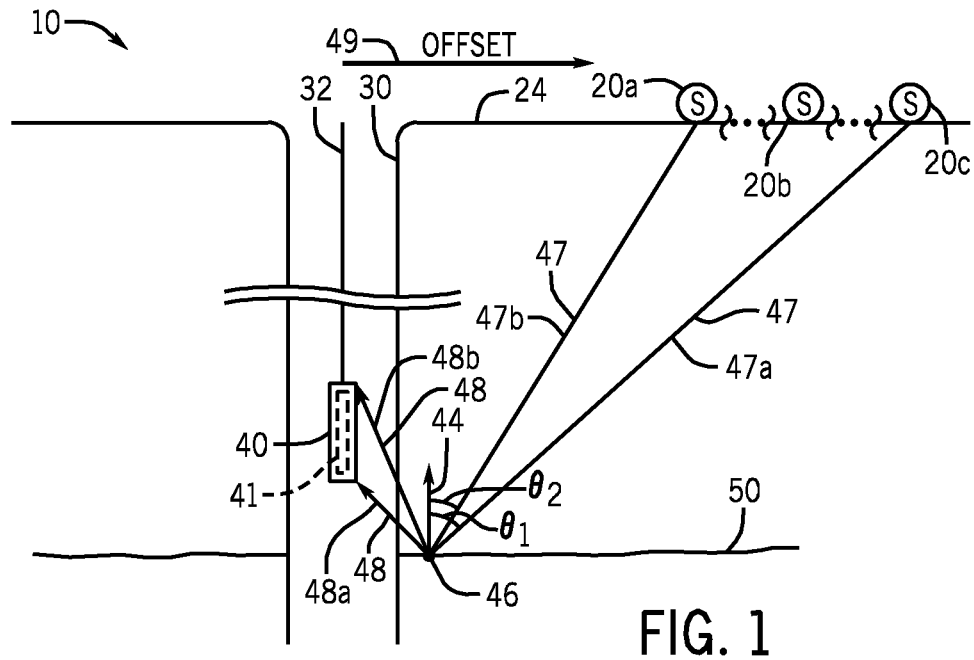
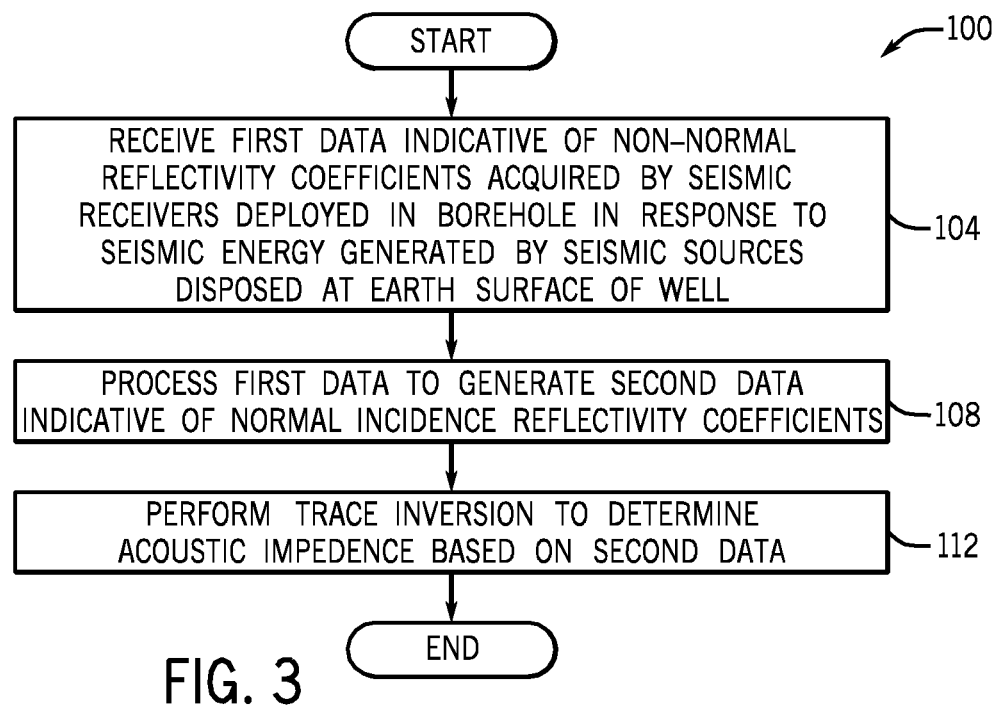

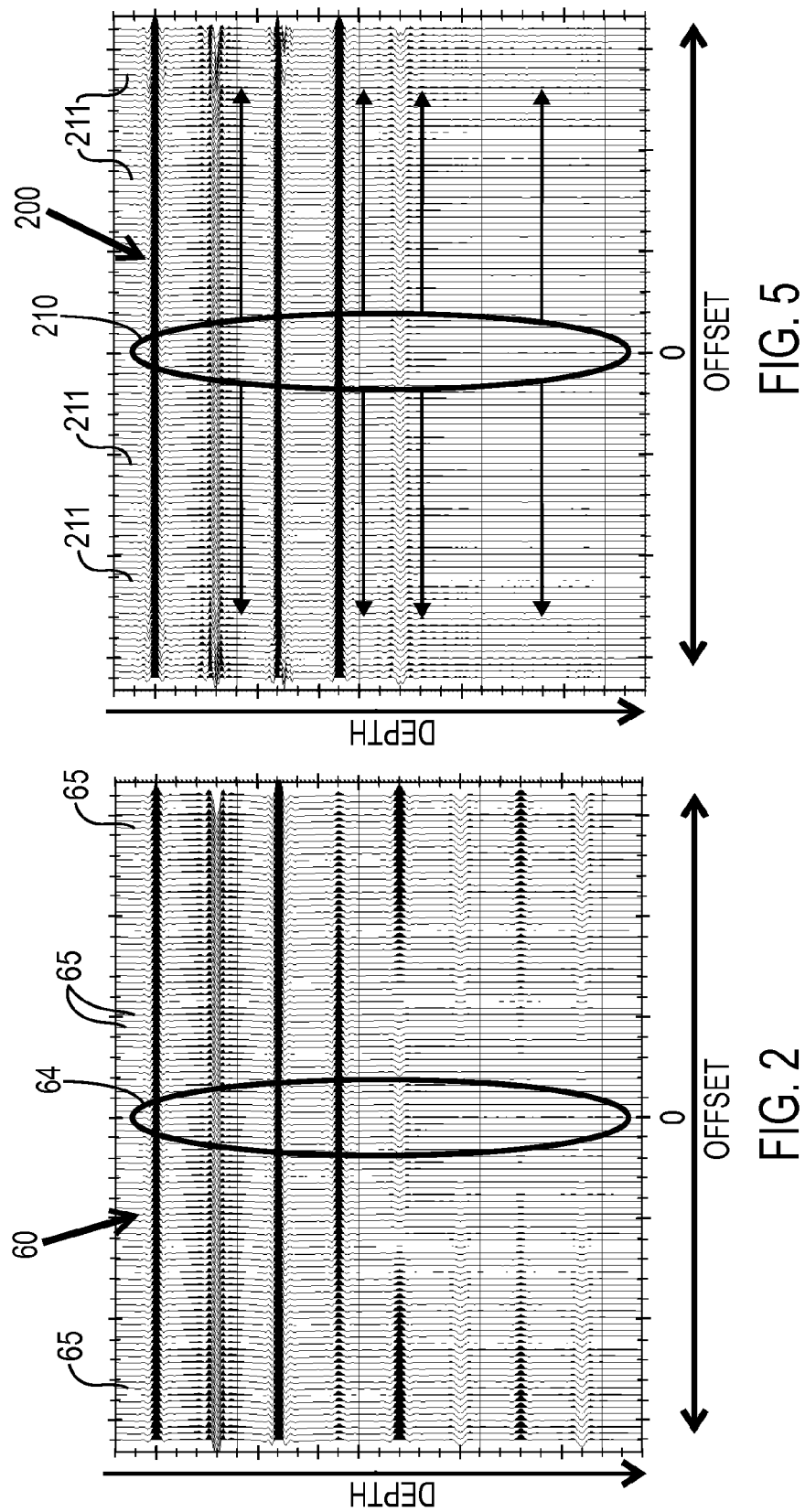

GENERATING INVERSION READY SEISMIC DATA

This application claims the benefit under 35 U.S.C. §119(e) to U.S. Provisional Patent Application Ser. No. 61/380,775 entitled, "INVERSION READY MULTI-RECEIVER MULTI-SOURCE VSP IMAGE," which was filed on Sep. 8, 2010, and is hereby incorporated by reference in its entirety.

BACKGROUND

The invention generally relates to data processing, and more particularly to generating inversion ready seismic data.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensor, both hydrophones and geophones, and/or other suitable sensor types. For example, one use of the seismic traces is that the traces may be inverted to determine the acoustic impedance for a subterranean region of interest.

SUMMARY

In one implementation, a technique includes receiving first seismic data acquired by one or more receivers in response to energy produced by one or more seismic sources interacting with a subsurface feature. The first seismic data is indicative of measured reflection coefficients for image points for the subsurface feature, the measured reflection coefficients are associated with incidence angles, and a range of the incidence angles varies with respect to an image point position. The technique includes processing the first seismic data in a machine to generate second data indicative of a normal incidence reflection coefficient for at least one of the image points not associated with a normal angle of incidence.

In another implementation, a system includes an interface to receive data acquired by one or more receivers in response to energy produced by one or more seismic sources interacting with at least one subsurface feature. The data is indicative of measured reflection coefficients for image points for the subsurface feature(s), the measured reflection coefficients are associated with incidence angles, and a range of the incidence angles varies with respect to an image point position. The system includes a processor to determine a normal incidence reflection coefficient for at least one of the image points not associated with a normal angle of incidence.

In yet another implementation, a technique includes receiving first data that is acquired by one or more sensors in response to energy produced by one or more energy emission sources interacting with a feature. The first data is indicative of measured reflection coefficients for image points for the feature, the measured reflection coefficients are associated with incidence angles, and a range of the incidence angles varies with respect to an image point position. The technique includes processing the first data in a machine to generate second data indicative of a normal incidence reflection coefficient for at least one of the image points not associated with a normal angle of incidence.

In alternative or further implementations, the first seismic data further indicates traces acquired by the one or more receivers.

In alternative or further implementations, the processing includes determining the normal incidence reflection coefficient for the image point(s) based at least in part on one or more of the measured reflection coefficients.

In alternative or further implementations, the processing further includes determining at least one of the incidence angles for the at least one image point.

In alternative or further implementations, the determination of the incidence angle(s) includes performing two point ray tracing.

In alternative or further implementations, the performing the two point ray tracing includes incorporating a predetermined dip field.

In alternative or further implementations, the one or more receivers are deployed in a borehole, and the seismic source(s) are disposed along an Earth surface.

In alternative or further implementations, the receiver(s) and the seismic source(s) are associated with a borehole seismic (BHS) acquisition system.

In alternative or further implementations, the processing further includes applying a linear regression analysis to extrapolate the normal incidence reflection coefficient based on one or more of the measured reflection coefficients.

In alternative or further implementations, the processing further includes determining an acoustic impedance based at least in part on the second data.

In alternative or further implementations, the energy that is produced by the seismic source(s) includes at least one compression wave, and the normal incidence reflection coefficient is associated with at least one compression wave.

In alternative or further implementations, the energy that is produced by the seismic source(s) includes at least one shear wave, and the normal incidence reflection coefficient is associated with at least one shear wave.

In alternative or further implementations, the energy that is produced by the seismic source(s) includes at least one compression wave, and the normal incidence reflection coefficient is associated with at least one shear wave converted from the compression wave(s).

Advantages and other features of the invention will become apparent from the following drawings, description and claims.

BRIEF DESCRIPTION OF THE DRAWINGS

FIG. 1 is a schematic diagram of a seismic acquisition system according to an embodiment of the invention.

FIG. 2 is an illustration of a reflection point mapping without accounting for non-normal angles of incidence.

FIG. 3 is a flow diagram depicting a technique to process seismic data to account for non-normal angles of incidence according to an embodiment of the invention.

FIG. 5 is an illustration of a reflection point mapping after correcting for non-normal angles of incidence according to an embodiment of the invention.

DETAILED DESCRIPTION

Figure 4:
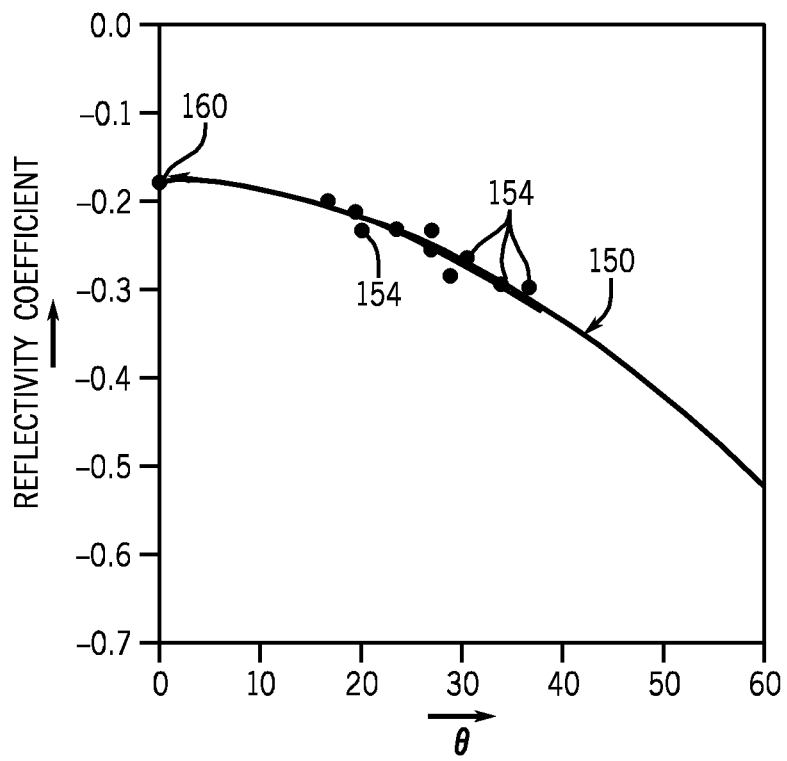
FIG. 4 is an illustration of the use of linear regression to extrapolate a normal incidence reflection coefficient for a subsurface image point according to an embodiment of the invention.

Although trace inversion (i.e., the inversion of seismic traces to acoustic impedance) assumes that the seismic data being processed represent the convolution of a wavelet with normal incidence reflection coefficients, this underlying assumption does not hold true for certain survey geometries, such as multi-offset, multi-receiver borehole seismic (BHS) geometries (e.g., vertical seismic profile (VSP) survey geometries). Techniques and systems are disclosed herein for processing seismic data acquired using a relatively small aperture survey geometry for which it cannot be accurately assumed that the measured seismic waves have normal or near normal angles of incidence for purposes of generating inversion ready seismic data that satisfies the underlying assumption.

As a non-limiting example, FIG. 1 depicts a seismic acquisition system 10, which presents one such survey geometry. In accordance with non-limiting example implementations, the seismic acquisition system 10 may be a BHS system in which an array of seismic receivers (herein called the "receiver array 41") is deployed in a well borehole 30 or other suitable region or regions for seismic surveying and analysis; and seismic sources 20 (seismic sources 20a, 20b and 20c being depicted in FIG. 1 as non-limiting examples) are disposed at or near the Earth surface 24 of the well at various lateral source-to-receiver offsets (see offset axis 49) from the receiver array 41. As a non-limiting example, the seismic receivers of the receiver array 41 may be formed on an optical fiber.

It is noted that the seismic acquisition system 10 is merely an example of one of many potential seismic acquisition systems, which may acquire seismic trace data that are processed according to the systems and techniques that are disclosed herein. For example, although FIG. 1 depicts the example seismic sources 20a, 20b and 20c at positive source-to-receiver offsets, the sources may be deployed at negative offsets as well and may be deployed (as a non-limiting example) symmetrically with respect to the receiver array 41 at positive and negative source-to-receiver offsets. In general, the seismic sources may be arbitrarily distributed in three-dimensional (3-D) space, in accordance with the many possible embodiments of the invention. The actual number of seismic sources 20 that are used, the locations of these seismic sources and the source spacing employed depends on the particular implementation. Moreover, the receiver array 41 may contain forty to about one hundred twenty seismic receivers, in accordance with some implementations. However, in some embodiments, receiver array 41 may contain fewer than forty seismic receivers (e.g., one or more), and in alternate embodiments, receiver array 41 may comprise more than one hundred twenty seismic receivers (e.g., hundreds, or even thousands, of seismic receivers). Although FIG. 1 depicts the receiver array 41 as being deployed downhole in the borehole 30 as part of a tool 40 via a conveyance mechanism 32 (such as a wireline, slickline or coiled tubing, as non-limiting examples), the receivers and/or receiver array 41 may be deployed downhole as part of a tubular string, in accordance with other embodiments of the invention. Further, in some embodiments, receiver array 41 may include two or more seismic receiver subarrays, each seismic receiver subarray having one or more seismic receivers. Additionally, in some embodiments, receiver array 41 may be deployed for seismic acquisition in a plurality of tools, and/or by a plurality of conveyance mechanisms. In some embodiments, one or more seismic receiver subarrays may be disposed in a plurality of respective tools (e.g., a single tool may include multiple seismic receiver subarrays that form a single seismic receiver array; a single tool may include a single seismic receiver array; a plurality of tools may include a single seismic receiver array, for example, a first tool includes a first seismic receiver subarray, and a second tool includes a second seismic receiver subarray, such that the first and second seismic receiver subarrays form a seismic receiver array). Moreover, in some embodiments, receiver array 41 may include a plurality of seismic receiver subarrays, wherein a first seismic receiver subarray in the plurality of seismic receiver subarrays is deployed in a first seismic survey region, and a second seismic receiver subarray in the plurality of seismic receiver subarrays is deployed in a second seismic survey region (e.g., two or more respective seismic receiver subarrays are deployed in two or more respective boreholes or other suitable subterranean regions for seismic imaging). Thus, many variations are contemplated and are within the scope of the appended claims.

For purposes of seismic data processing, the geometry of the seismic acquisition system 10 generally precludes selecting the source locations to be close to the receiver locations for any arbitrary image point (such as exemplary image point 46). As a result, for most of the image points, the propagation directions of the incident seismic waves form non-zero angles with the normals (such as the normal 44, for example) of these image points, and consequently, the propagation directions of the reflected, or P-p specular waves (i.e., compression waves produced by reflections of compression waves from the sources) that are received by the receivers of the receiver array 41 also form non-zero angles with the normals. In general, the seismic sources 20 may be selectively activated at different times to produce incident seismic waves (represented by incident rays 47, such as exemplary rays 47a and 47b in FIG. 1), which reflect from one or more subsurface reflectors (a subsurface interface 50, such as a sand-shale interface, as a non-limiting example) to produce corresponding p-p specular waves (represented by reflected rays 48, such as exemplary rays 48a and 48b in FIG. 1). Except directly beneath the receiver array 41, the propagation directions of the incident and reflected seismic waves are not normal to interface 50 or to the corresponding image points. Moreover, the central incidence angle increases away from zero source-to-receiver offset. Therefore, due to the vertical extent of the receiver array and the spatial relationships between the seismic sources 20a, 20b and 20c and the receiver array 41 not varying during the survey, the offset image points are illuminated by an increasing range of angles with offset until the edge of the survey where fold falls to zero. Therefore, in general, it may be assumed that the seismic data acquired for the various image points are associated with a limited and variable range of angles of incidence such that the range of angles that illuminate the image points vary among the image points.

In general, the receivers of the receiver array 41 sense multiple traces for a given image point. For the example that is depicted in FIG. 1, incident seismic waves (represented by rays 47a and 47b) associated with different sources 20a and 20c reflect from the same image point 46 and produce corresponding specular seismic waves (represented by rays 48a and 48b) that are received by different receivers of the receiver array 41. In this manner, the incident seismic wave that is produced by the seismic source 20c and is represented by the ray 47a reflects from the image point 46 to produce a P-p specular wave that is represented by ray 48a and has an associated non-zero angle of incidence (called "$\theta_2$" in FIG. 1) with respect to the normal 44 of the image point 46. As also depicted in FIG. 1, the incident seismic wave that is produced by the seismic source 20a and is represented by the ray 47b reflects from the image point 46 to produces a P-p specular wave that is represented by ray 48b and has an associated non-zero angle of incidence (called "$\theta_2$" in FIG. 1) with respect to the normal 44 of the image point 46.

In general, the central incidence angle (average of the minimum and maximum incidence angles) generally increases with the source-to-receiver offset. Due to the vertically extending receivers of the receiver array 41, an increasing range of angles exists for an increasing image point offset until the edge of the survey geometry where the fold (i.e., the number of traces per image point) falls to zero. The consequence of this variation of the incidence angle and range can be seen in an example reflection point mapping 60 of FIG. 2.

Referring to FIG. 2 in conjunction with FIG. 1, the mapping 60 represents a synthetic dataset representative of traces 65 acquired by eleven receivers of the receiver array 41 from a 3.0 kilometer (km) to 3.5 km depth as a result of simulated seismic energy produced by 101 sources 20 disposed every 100 meters (m) at offsets from −5 km to 5 km and incident upon a modeled geology. The mapping contains a trace 65 for each source-to-receiver offset, which is generated by stacking the acquired traces for each offset (though in some embodiments, traces are performed for a subset of source-to-receiver offsets, rather than for each offset). For this example, the traces near the zero source-to-receiver offset (denoted by region 64 of the mapping 60) are generally uniform, which is generally expected due to the associated angles of incidence being relatively small (i.e., due to normal or near normal angles of incidence). However, with an increasing offset (outside of the region 64), a uniform brightening as a function of offset is depicted in FIG. 2 due to the angles of incidence no longer being normal. It is noted that the brightening is a result of the particular modeled geology, as other effects (a dimming of the reflection coefficients, for example) may occur with increasing source-to-receiver offset, for other modeled geologies. However, regardless of the underlying geology, inverting the traces 60 to derive an acoustic impedance of the surveyed region without accounting for non-normal incidences may lead to relatively inaccurate results.

Therefore, in accordance with some embodiments of the invention that are disclosed herein, the data acquired by seismic receivers of a geometry in which the incidence angles are not normal angles are first processed to compensate the data so that the data indicates seismic energy associated with normal angles of incidence. This compensated data forms "inversion ready data," which may be subsequently inverted for acoustic impedance using inversion algorithms that presume normal angles of incidence. More specifically, referring to FIG. 3 in conjunction with FIG. 1, in accordance with some embodiments of the invention, a technique 100 includes receiving (block 104) first data indicative of non-normal reflection coefficients acquired by seismic receivers deployed in a borehole in response to seismic energy generated by seismic sources, which are disposed at the Earth surface of the well. It is noted that the first data may also indicate normal reflection coefficients, as the range of the incidence angles vary with respect to image point position. The first data are processed (block 108) to generate second data indicative of normal incidence reflection coefficients for image points which are not associated with normal angles of incidence, pursuant to block 108. The technique 100 includes performing (block 112) trace inversion to determine acoustic impedance based on the second data.

In accordance with embodiments of the invention, the normal incidence reflection coefficients are extrapolated from the acquired seismic data using regularized linear regression. As a non-limiting example of this technique, FIG. 4 depict acquired, or measured, reflection coefficients 154, as indicated by the seismic data acquired by the receivers of the receiver array 41 (see FIG. 1) for a given image point (such as image point 46 of FIG. 1, for example). The reflection coefficients 154 are plotted in FIG. 4 as a function of their magnitudes (vertical axis) and incidence angles (called "$\theta$" in FIG. 4 on the horizontal axis). For this example, a graph, or curve 150, is determined, which forms a "best fit" to the acquired coefficients. Many different parameters (the damping parameter, the receiver fold threshold, etc.) may be varied for purpose of constraining the linear regression and in general, controlling the extrapolation of the normal incidence reflection coefficient. The next result is determining the curve 150, which minimizes an overall error between the coefficients 154 and the curve 150.

As shown in FIG. 4, the curve 150 intercepts the vertical axis (where the angle of incidence $\theta$ equals zero) at point 160, which identifies the extrapolated normal incidence reflection coefficient. As a more specific, non-limiting example, for purposes of fitting the curve 150 to the measured reflectivity coefficients 154, a regularized regression, such as the following linear equation, may be used:

$$Rpp(\theta)=a+b\sin^2(\theta)+\sin^4(\theta) \qquad \text{Eq. 1}$$

where "$Rpp(\theta)$" represents the curve 150 as a function of the incidence angle $\theta$; and "a," "b," and "c" represent parameters that are adjusted to fit the curve 150 to the acquired coefficients 154. Given the extrapolated normal incidence reflection coefficient 160, a trace associated with the corresponding image point may then be adjusted obtained. In other implementations, non-linear anisotropic regression, such as Zoeppritz regression, may be used.

As a non-limiting example, FIG. 5 depicts application of the technique 100 to the reflection point mapping 60 of FIG. 2 to produce a reflection point mapping 200. In this manner, FIG. 5 contains corrected traces 211, which have associated normal incidence reflection coefficients. Comparing FIG. 5 to FIG. 2, outside of a region 210 near zero offset, the brightening of FIG. 2 is substantially reduced, as the traces 211 outside of the region 210 are generally uniform.

It is noted that although the reflection mappings of FIGS. 2 and 5 were produced using synthetically generated data using a presumed model of the underlying geology and a rather small synthetic data set of eleven seismic receivers, the results are expected to be significantly better for longer arrays, such as an array of forty to one hundred twenty receivers, as a non-limiting example.

In accordance with some embodiments of the invention, the technique 100 involves storing, as part of the migration or as a process that occurs after migration, volumes of specular incidence angles for each migrated receiver gather volume. The determination of the specular rays may be performed using, for example, two-point ray tracing: an iterative search is used to find the ray connecting the source, image point and receiver, which has the minimum travel time. To satisfy Snell's Law at each image point, a previously-determined dip field is also taken into account, in accordance with non-limiting, example implementations.

The trace inversion may be applied, however, in stratigraphic traps, where structural geology does not abruptly spatially change. Due to this fact and because two point ray-tracing may be a relatively expensive computation in complex velocity models, the two-point ray tracing may be performed, in accordance with some embodiments of the invention, using a one-dimensional (1-D) anisotropic background velocity model together with residual source statics which will usually be sufficient for imaging. In this case, the specular incidence angles may be determined in a more stratographically efficient manner. More complex velocity models may be used, however, in accordance with other embodiments of the invention.

Figure 6:
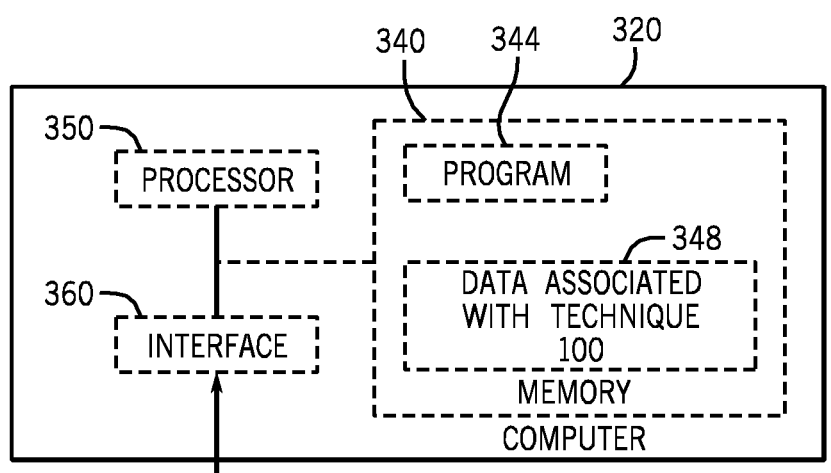
FIG. 6 is a schematic diagram of a data processing system according to an embodiment of the invention.

Referring to FIG. 6, in accordance with some embodiments of the invention, a machine, such as a data processing system 320, may contain a processor 350 for purposes of processing seismic trace data associated with a small aperture seismic survey in which normal incidence angles may not be presumed for the image points for purposes of performing at least one or more of the techniques that are disclosed herein.

In accordance with some embodiments of the invention, the processor 350 may be formed from one or more microprocessors and/or microprocessor processing cores and thus, may itself be formed from multiple processors. As a non-limiting example, the processor 350 may be disposed at the well 10 (see FIG. 1), or may be disposed at a remote site. Moreover, the data processing system 320 may be a distributed processing system, in accordance with some embodiments of the invention.

As depicted in FIG. 6, the processor 350 may be coupled to a communication interface 360 for purposes of receiving seismic trace data, such as seismic trace data acquired in a BSH seismic data acquisition system, for example. As examples, the communication interface 360 may be a Universal Serial Bus (USB) interface, a network interface, a removable media interface (a flash card, CD-ROM interface, etc.) or a magnetic storage interface (IDE or SCSI interfaces, as non-limiting examples). Thus, the communication interface 360 may take on numerous forms, depending on the particular embodiment of the invention.

In accordance with some embodiments of the invention, the processor 350 is coupled to a memory 340, which stores program instructions 344, which when executed by the processor 350, may cause the processor 350 to perform various tasks of one or more of the techniques that are disclosed herein, such as the technique 100, for example. As a non-limiting example, in accordance with some embodiments of the invention, the instructions 344, when executed by the processor 350, may cause the processor 350 to determine normal incidence reflection coefficients for image points based at least in part on data acquired by receivers in response to energy produced by seismic sources interacting with at least one subsurface feature, where the data are indicative of plurality of measured reflection coefficients for each image point of a plurality of image points for the subsurface feature(s) and the measured reflection coefficients for each image point are associated with a plurality of incidence angles. The instructions 344, when executed by the processor 350, may, as another non-limiting example, cause the processor 350 to determine an acoustic impedance based at least in part on the normal incidence reflection coefficients. Moreover, the instructions 344, when executed by the processor 350, may cause the processor 305 to perform at least one or more parts of the other techniques disclosed herein, such as regularized linear regression, two point ray tracing, etc.

More specifically, in accordance with example implementations, the instructions, when executed by the processor 305 cause the processor 305 to receive data acquired by one or more receivers in response to energy produced by one or more seismic sources interacting with a subsurface feature, where the image points are associated with sets of at least one incidence angle, the incidence angles varying among the associated image points, the data is indicative of one or more measured reflection coefficients for image points for the subsurface feature and the one or more measured reflection coefficients are associated with one or more non-normal incidence angles; and determine a normal incidence reflection coefficient for at least one of the image points not associated with a normal angle of incidence.

The memory 340 is a non-transitory memory and may take on numerous forms, such as (as non-limiting examples) semi-conductor storage, magnetic storage, optical storage, phase change memory storage, capacitor-based storage, etc., depending on the particular implementation. Furthermore, the memory 340 may be formed from more than one of these non-transitory memories, in accordance with some embodiments of the invention. When executing the program instruction 344, the processor 340 may also, for example, store preliminary, intermediate and/or final results obtained via the execution of the program instructions 344 as data 348 in the memory 340.

It is noted that the data processing system 320 is merely an example of one out of many possible architectures for processing the seismic data in accordance with the techniques that are disclosed herein. Moreover, the data processing system 320 is represented in a simplified form, as the processing system 320 may have various other components (a display to display initial, intermediate or final results of the system's processing, as a non-limiting example), as can be appreciated by the skilled artisan. Thus, many variations are contemplated and are within the scope of the appended claims.

Other embodiments are contemplated and are within the scope of the appended claims. For example, in accordance with other embodiments, the systems and techniques that are disclosed herein may be used for purposes of determining normal reflection coefficients for waves other than P-p waves. For example, in accordance with some embodiments, the gradient information derived from the analysis of the reflection coefficients may be used to extrapolate normal reflection coefficients for shear waves. These shear waves may be converted waves (P-s waves) that are produced by compression waves from the seismic sources 20 reflecting from the subsurface reflector(s) as well as shear waves that are produced by the reflection of shear waves from the seismic sources 20 from the subsurface reflector(s), or "S-s waves."

While the embodiments disclosed herein have been described with respect to a limited number of embodiments, those skilled in the art, having the benefit of this disclosure, will appreciate numerous modifications and variations therefrom. It is intended that the appended claims cover all such modifications and variations as fall within the true spirit and scope of this disclosure.

What is claimed is:

1. A method comprising:
receiving first seismic data acquired by one or more receivers in response to energy produced by one or more seismic sources interacting with a subsurface feature, wherein:
the first seismic data representing measured reflection coefficients for image points for the subsurface feature,
the measured reflection coefficients being associated with incidence angles, and
a range of the incidence angles varying with respect to an image point position;
processing the first seismic data in a machine to generate second data representing a reflection coefficient for a normal angle of incidence for at least one of the image points for which the measured reflection coefficient does not have an associated normal angle of incidence; and
processing the second data to determine an acoustic impedance for the at least one image point.

2. The method of claim 1, wherein the first seismic data further represents traces acquired by the one or more receivers.

3. The method of claim 1, wherein the processing comprises determining the normal incidence reflection coefficient for the at least one image point based at least in part on one or more of the measured reflection coefficients.

4. The method of claim 3, wherein the processing further comprises determining at least one of the incidence angles for the at least one image point.

5. The method of claim 4, wherein the determining the at least one incidence angle comprises performing two point ray tracing.

6. The method of claim 5, wherein the performing the two point ray tracing comprises incorporating a predetermined dip field.

7. The method of claim 1, wherein the one or more receivers are deployed in a borehole, and the one or more seismic sources are disposed along an Earth surface.

8. The method of claim 1, wherein the one or more receivers and the one or more seismic sources are associated with a borehole seismic (BHS) acquisition system.

9. The method of claim 1, wherein the processing further comprises:
applying a linear regression analysis to extrapolate the incidence reflection coefficient for the normal angle of incidence based on one or more of the measured reflection coefficients.

10. The method of claim 1, wherein the energy produced by the one or more seismic sources comprises at least one compression wave and the reflection coefficient for the normal angle of incidence is associated with at least one compression wave.

11. The method of claim 1, wherein the energy produced by the one or more seismic sources comprises at least one shear wave and the reflection coefficient for the normal angle of incidence is associated with at least one shear wave.

12. The method of claim 1, wherein the energy produced by the one or more seismic sources comprises at least one compression wave and the measured reflection coefficient is associated with at least one shear wave converted from the at least one compression wave.

13. The method of claim 1, wherein the reflection coefficient for the normal angle of incidence comprises a nonzero reflection coefficient.

14. The method of claim 1, wherein processing the first seismic data to generate the second data comprises determining a reflection coefficient for a normal angle of incidence for a specular wave selected from the set consisting essentially of a P-p wave and an S-s wave.

15. A system comprising:
an interface to receive data acquired by one or more receivers in response to energy produced by one or more seismic sources interacting with at least one subsurface feature, wherein:
the data being representing measured reflection coefficients for image points for the at least one subsurface feature,
the measured reflection coefficients being associated with incidence angles, and
a range of the incidence angles varying with respect to an image point position; and
a processor to:
determine a reflection coefficient for a normal angle of incidence for at least one of the image points not associated with a measured reflection coefficient that has a normal angle of incidence, and
process the determined reflection coefficient to determine an acoustic impedance for the at least one image point.

16. The system of claim 15, wherein the processor is further adapted to determine at least one of the incidence angles based at least in part on the data.

17. The system of claim 15, wherein the one or more receivers are disposed in a borehole, and the one or more seismic sources are disposed along an Earth surface.

18. The system of claim 15, wherein the one or more receivers and the one or more sources are associated with a borehole seismic (BHS) acquisition system.

19. The system of claim 15, wherein the processor is further adapted to apply a linear regression to, for the at least one image point, extrapolate the reflection coefficient for the normal angle of incidence based on at least one of the measured reflection coefficients.

* * * * *